June 30, 1970  J. ENGLISH  3,518,532
PENNING PUMP POWER SUPPLIES
Filed March 7, 1968  3 Sheets-Sheet 2

JAMES ENGLISH
INVENTOR

BY *Hall & Houghton*

ATTORNEY

JAMES ENGLISH
INVENTOR

United States Patent Office 3,518,532
Patented June 30, 1970

3,518,532
PENNING PUMP POWER SUPPLIES
James English, Crawley, Sussex, England, assignor to Edwards High Vacuum International Limited, Crawley, England, a British company
Filed Mar. 7, 1968, Ser. No. 711,316
Claims priority, application Great Britain, Mar. 10, 1967, 11,412/67
Int. Cl. G01n *27/00;* H02m *7/10;* H01i *13/30*
U.S. Cl. 324—33          1 Claim

ABSTRACT OF THE DISCLOSURE

A Penning pump power supply in which the secondary of the supply transformer is provided with a bridge rectifier voltage doubler circuit. A measuring circuit is interposed between this circuit and the Penning pump for the purpose of measuring the current and voltage conditions of the pump when in use. This circuit also incorporates excess- and surge-current protection devices which serve to disconnect the supply if necessary. The pump current is also limited by providing a high reactance at the transformer. This can be supplemented by placing a thermistor at the pump input.

---

This invention relates to Penning pump power supplies.

Power supplies for use with a Penning pump are required both to supply a high voltage to maintain pumping speed at low pressures and to supply a high current for rapid pumping down from the high pressure end of its range. At high pressures the pump impedance becomes very low so that provision should be made to reduce the output voltage virtually to zero at the highest rated current.

According to the present invention a Penning pump power supply comprises a transformer to the secondary of which is connected a bridge rectifier voltage doubler circuit which gives an output for connection to a Penning pump electrode assembly.

A further feature of the invention comprises the inclusion of a series choke arranged in the transformer primary for the purpose of limiting the current to a safe value under heavy load or short circuit. Alternatively a transformer having a high leakage reactance, to give the same performance as a series choke may be used. In a preferred form a thermistor is connected in series with one of the output lines from the voltage doubler circuit.

The invention will now be described in greater detail, by way of example, with reference to the accompanying drawings in which.

Figure 1:
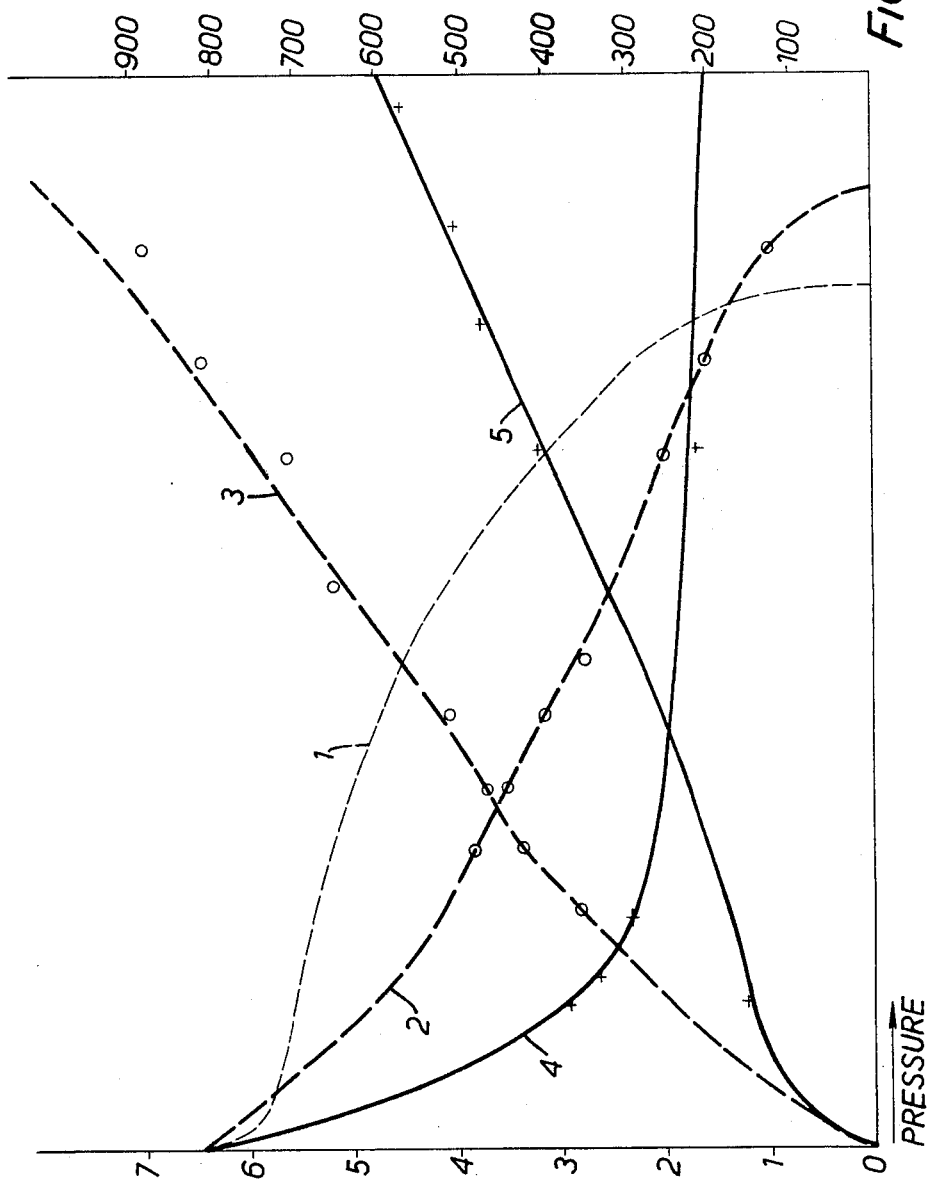
FIG. 1 shows graphically the load characteristics of a supply in accordance with the invention together with the characteristic of known supplies.

Referring now to FIG. 1, there are shown plotted against load, which depends upon the pressure conditions at which the Penning pump is operating, the voltage and current characteristics of two supplies. There is also the voltage characteristic, curve 1, of a supply such as often been used in the past. This refers to a supply employing a high reactance transformer and curve 1 represents the voltage characteristic employing a 4.3 kv. transformer such as is compatible for use in the particular application here described. Clearly such a transformer is bulky and expensive.

Curve 2 shows the corresponding voltage characteristic for a 2.3 kv. transformer having a conventional voltage doubler in its secondary, 0.7 μf. capacitors being employed. This gives an adequate performance but is associated with a slightly reduced speed in the region between 1.5 kv. and 5.6 kv. The currents in this region can be seen from the current characteristic curve 3 for the same supply. This current characteristic is that compatible with the use to which the supply is designed and represents a current rating of 1 amp, R.M.S. The transformer required in this case would be about two-thirds the size of the high reactance transformer mentioned above.

Curves 4 and 5 are the voltage and current characteristics employing a bridge doubler circuit as is required by the invention, a 2.3 kv. transformer and 0.2 μf. capacitors being used. Here the voltage characteristic curve 4 is depressed even further in the middle portion than curve 3 for the conventional doubler, but a satisfactory pumping performance is achieved. It will be noticed that the curve levels out over the majority of the operating range of loads. If larger capacitors are used in conjunction with a higher current rating, then the depression in curve 4 will be less pronounced with a corresponding improvement in performance. However, the associated current characteristic 5 rises to a maximum of about 600 ma. which is sufficiently high for operation of a Penning pump. The characteristics 4 and 5 are for a 2.3 kv. transformer with a current rating of 500 ma., R.M.S. and it will be seen that the transformer required for a supply made in accordance with the invention will be considerably less bulky than either of the transformers employed in the other circuits described above.

Figure 2:
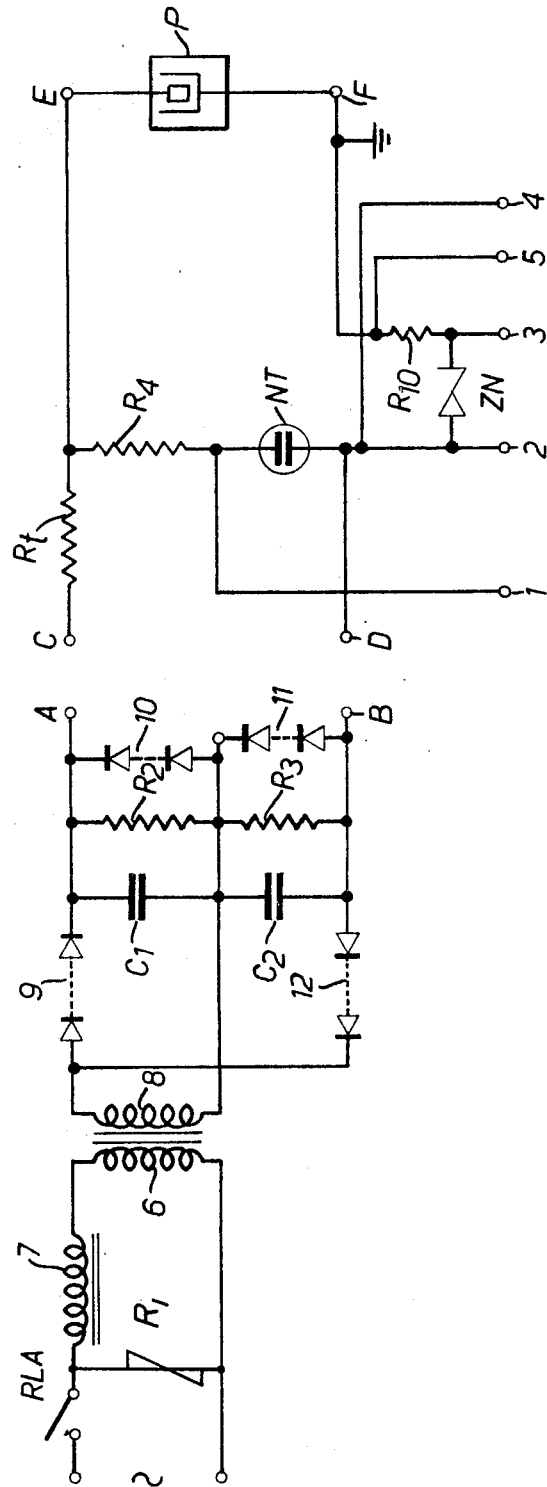
FIG. 2 shows the circuit of a power supply in accordance with the invention.

A 500 ma. power supply unit in accordance with the invention is shown in FIG. 2 of the accompanying drawings. This shows a 2.6 kv. R.M.S. transformer having a primary 6 to which is connected a series choke 7 and across which is shunted a voltage dependent resistor $R_1$. The mains supply can be turned off by a switch RLA which can be operated by a relay RLB to be described with reference to FIG. 3. The choke 7 can be an equivalent choke of about 0.1 H. in the primary 6 but its action is preferably carried out by building a high reactance into the transformer which is thus a high reactance 2.6 kv. transformer which gives a short circuit current of 550 ma. R.M.S. The secondary 8 of the transformer is connected to a bridge rectifier voltage doubler circuit comprising a bridge of rectifier strings 9, 10, 11 and 12 and two 0.25 μf. reservoir capacitors $C_1$ and $C_2$ which effect the voltage doubling. The capacitors $C_1$ and $C_2$ are shunted by 2.5 megohm resistors $R_2$ and $R_3$ respectively. The E.H.T. output from the doubler appears at terminals A and B positive and negative respectively. These terminals can be connected to terminals C and D of the supply unit output in dependence upon the required polarity of the E.H.T. output. The output part of the circuit shown in FIG. 3 comprises a series thermistor $R_t$ and a shunt circuit comprising a neon tube NT, a 120MΩ resistor $R_4$ and a centre tapping, terminal 1. Terminals 2, 3, 4 and 5 are provided for connection of the power supply unit to a control unit which will be described later with reference to FIG. 3. Terminals E and F are connected to the electrode assembly of a Penning pump.

Figure 3:
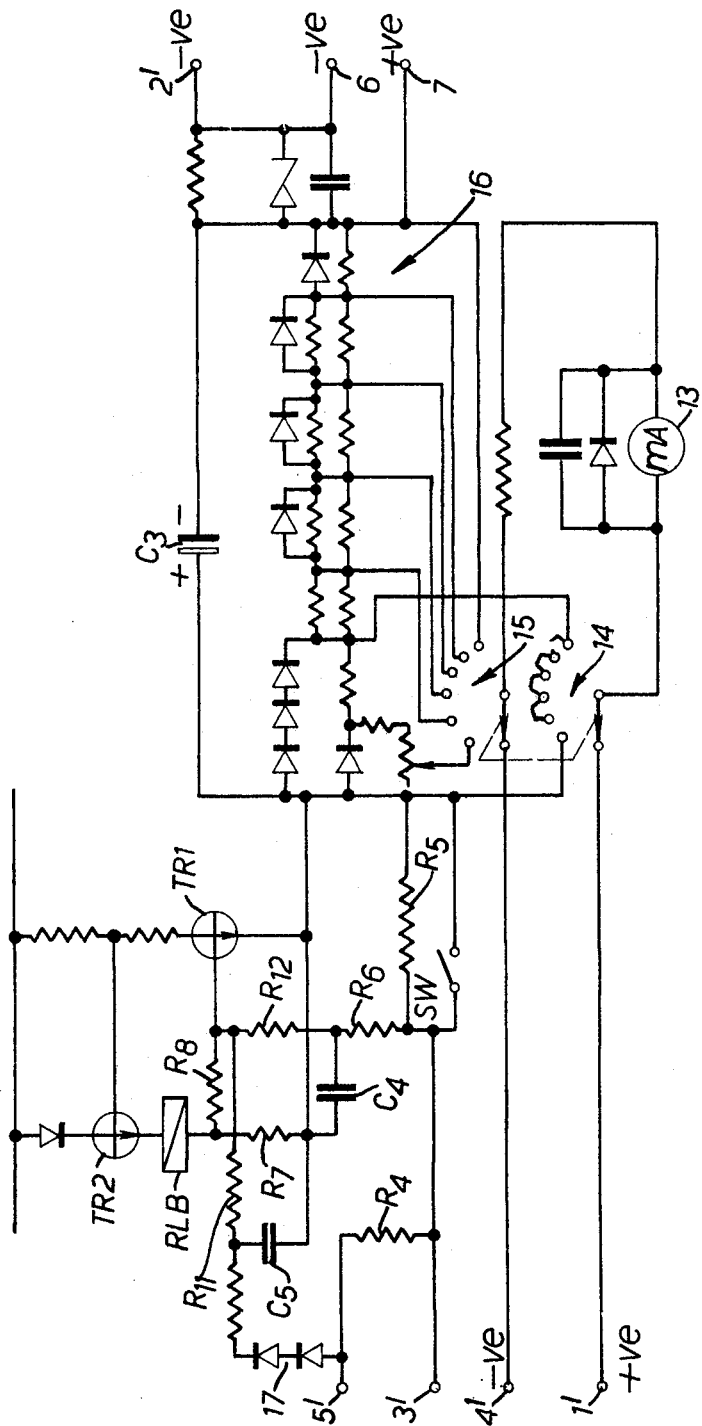
FIG. 3 shows a measuring circuit for connection in the supply shown in FIG. 2.

When the power supply is operating a Penning pump, protection has to be given again excessive currents at short circuit which would exceed the surge current rating of a Zener diode ZN which is connected across the meter circuit of FIG. 3. While this current is limited by the choke 7 or the high reactance of the transformer, the presence of the reservoir capacitors $C_1$ and $C_2$ can lead to very heavy currents flowing for a short time in the pump. Such surge currents can be limited by a series resistor or choke in the output circuit but, if adequate protection is to be afforded, these tend to be relatively expensive and the resistors require considerable space for cooling whereby they are not preferred. Instead, a thermistor, or a string of thermistors, $R_t$ is employed. Such thermistors will limit a short circuit at high voltage but will dissipate only a modest amount of power when running at high current when their resistance is low. When arcing occurs in the pump at high voltage the thermistors are initially cool and have a high resistance so that the current pulses are of a low amplitude. However, if arcing recurs rapidly the thermistors warm up, their resistance decreases and the pulse currents increase to an undesirably high level. For instance, it is conceivable that during continuous arcing the capacitors $C_1$ and $C_2$ may discharge fifty times a second whereby the thermistors heat up and are over-run. It is, therefore, necessary to provide a separate peak current protection, for both the power unit and the pump itself, which switches off the supply. When arcing at low pressure occurs, there are short repetitive high current pulses which produce a R.M.S. current in excess of the rated short circuit current but well below 100 ma. Both forms of protection can be provided in a control circuit which will now be described with reference to FIG. 3.

FIG. 3 shows, in a simplified form, a suitable control and measurement unit for use with the power unit described above. This includes a milliammeter 13 and ganged switches 14 and 15, a resistor configuration 16 for measuring currents at different loads (i.e. operating pressures) and, an electrolytic condenser $C_3$. Terminals 1', 2', 3', 4' and 5' are connected to corresponding terminals 1–5 of FIG. 2 for the polarity obtained if terminals A and B are connected to terminals C and D respectively. With the ganged switches 14 and 15 in the positions shown, the milliammeter 13 is connected across the neon tube NT (FIG. 2) to give a reading respresentative of the voltage supplied to the pump. The switches may then be turned in clockwise sense so that the pump current, flowing between terminals 2' and 3' can be measured, the various positions of switch 15 selecting a decreasing number of resistors in the chain 16 so that the current in the ammeter 13 is maintained within its own rating. In normal operation a switch SW is closed so that a resistor $R_5$ is short circuited.

The two forms of current protection, mentioned above, will now be described. Terminals 5 and 5' are subjected to a surge of current when a short circuit or an arc occurs. If switch SW is open so that the first protection circuit is switched in, then a current through resistor $R_5$ at a level between 100 ma. and 150 ma. will develop a potenial of about 0.6 volt which is sufficient to cause a transistor TR1 to conduct. This, in turn, will switch on a second transistor TR2 which will then energise a relay RLB which switches off the supply at switch RLA (FIG. 2). A resistor $R_6$ and a capacitor $C_4$ provide a time relay of the order of ten seconds (longer for small excess currents and shorter for large excess currents) to allow short period surges to be absorbed without switching off the supply. Low dissipation in transistor TR1 is achieved by ensuring positive switching of the circuit. This is effected by positive feedback via resistors $R_7$ and $R_8$.

In certain circumstances, arcing in the pump causes high surge currents to flow but the mean current remaining too low to switch the circuit already described. Such current surges at terminal 5' develop a potential across resistor $R_9$ in parellel with resistor $R_{10}$ (FIG. 2), this being applied to a capicitor $C_5$ through diodes 17. The capacitor $C_5$ then charges up with repeated current surges to about one volt whereupon the transistors TR1 and TR2 operate the relay RLB to switch off the supply by means of switch RLA (FIG. 2). The capacitor $C_5$ can discharge through resistors $R_{11}$, $R_{12}$ and $R_6$ so that pulses more than one second apart cannot accumulate a charge.

Also shown on FIG. 3 are terminals 6 and 7 across which is generated a voltage proportional to the pump current. This voltage may rise to about 5 volts (DC) at a pump current of 100 ma. and may be employed to operate an external amplifier at a selected current. Thus, if the equipment being pumped is in the process of being baked and the pressure increases too much so as to cause an undesirably high pump current, the external amplifier can be used to control the oven temperature.

A further addition can be made to the circuit of FIG. 3 for leak detection purposes. If a leak detection test is to be carried out a selected stabilised voltage can be used to provide a pump pressure dependent current to flow through a constant current generator, this current by-passing the milliammeter 13 so that the latter will give a zero reading in the absence of any leak.

It will thus be seen that a complete power supply can simply be constructed using a bridge rectifier voltage doubler circuit this allowing a smaller and cheaper transformer to be used.

I claim:
1. A Penning pump power supply comprising in combination:
   (a) a transformer having a primary winding and a secondary winding, said primary winding being adapted for connection to an electrical supply;
   (b) a bridge rectifier voltage doubler circuit connected across said secondary winding and having a first output terminal and a second output terminal;
   (c) a first and a second Penning pump input terminal, said first output terminal being connected to said first input terminal;
   (d) a voltage divider connected between said first and second input terminals;
   (e) a measurement circuit connected between said second output terminal, said second input terminal and a point of said voltage divider;
   (f) an ammeter forming part of said measurement circuit;
   (g) switching means forming part of said measurement circuit and arranged for selectively switching said ammeter to measure the current flowing between said second output terminal and said second input terminal or flowing from said point on said voltage divider through said ammeter to said second input terminal;
   (h) an excess current protection device incorporated in said measurement circuit, said device including a relay actuable to cut off the supply to said primary winding;
   (i) a timing circuit connected and arranged to delay actuation of said relay and to prevent actuation thereof unless an excess current flows to said pump for more than a predetermined time; and
   (j) a surge current protection device incorporated in said measurement circuit, which surge current protection device includes voltage generating means which generate a voltage in proportion to the magnitude of any current surge in said pump, a capacitor connected to said voltage generating means, and said relay adapted and connected to cut off the electrical supply from said primary winding when said capacitor is changed to a predetermined level, said first output terminal and said first pump input terminal being connected through a thermistor.

References Cited

UNITED STATES PATENTS 3,118,103  1/1964   Mandoli et al. _____ 321—15
3,412,310  11/1968  Quinn _____ 315—108 X

FOREIGN PATENTS 371,502  10/1963  Switzerland.
987,279  3/1965   Great Britain.

J. D. MILLER, Primary Examiner

W. H. BEHA, JR., Assistant Examiner

U.S. Cl. X.R.

315—108; 321—15